(12) United States Patent
Tanaka

(10) Patent No.: US 7,070,245 B2
(45) Date of Patent: Jul. 4, 2006

(54) BICYCLE WHEEL HAVING A RIM AND A HUB CONNECTED BY SPOKES

(76) Inventor: Toru Tanaka, Nagahoriyachiyo Bldg. 7 floor, 11-9, Minamisenba 1 chome, Chuo-ku, Osaka 542-0081 (JP)

( * ) Notice: Subject to any disclaimer, the term of this patent is extended or adjusted under 35 U.S.C. 154(b) by 154 days.

(21) Appl. No.: 10/814,340

(22) Filed: Apr. 1, 2004

(65) Prior Publication Data

US 2004/0262983 A1   Dec. 30, 2004

(30) Foreign Application Priority Data

Jun. 25, 2003   (JP) .............................. 2003-181906

(51) Int. Cl.
*B60B 21/06* (2006.01)
(52) U.S. Cl. ..................... 301/59; 301/110.5
(58) Field of Classification Search ................. 301/56, 301/59, 61, 110.5, 110.6
See application file for complete search history.

(56) References Cited

U.S. PATENT DOCUMENTS

| 430,687 | A | * | 6/1890 | Reinhold | 301/59 |
|---|---|---|---|---|---|
| 556,124 | A | * | 3/1896 | Wolff | 301/58 |
| 748,684 | A | * | 1/1904 | Andersen et al. | 301/58 |
| 5,429,421 | A | * | 7/1995 | Watson | 301/61 |
| 6,010,197 | A | * | 1/2000 | Crosnier et al. | 301/59 |
| 6,666,525 | B1 | * | 12/2003 | Schroepfer | 301/80 |

FOREIGN PATENT DOCUMENTS

| JP | 54-71856 U | 5/1979 |
|---|---|---|
| JP | 08-108701 | 4/1996 |

* cited by examiner

*Primary Examiner*—Russell D. Stormer
(74) *Attorney, Agent, or Firm*—Westerman, Hattori, Daniels & Adrian, LLP.

(57) ABSTRACT

A bicycle wheel having spokes (4) stretched between a hub (1) and a rim (3), wherein in order to increase durability with optimizing the number of spoke crossing, a hub collar surface (6) is provided parallel with an elevation angle (5) caused by the spokes (4) between the hub collar (2) and the rim (3), hub holes (9) are provided approximately at a right angle to the elevation angle (5), spoke insert holes (12) are bored in the outer peripheral surface (14) of the hub collar, opposed peripheral restraint walls (13) are provided on the outer peripheral surface (14) of the hub collar (2), one end of each spoke (4) inserted from the spoke insert hole (12) is threadedly fastened to a hub nipple (8) fitted into the hub hole (9), and the other end is threadedly fastened to a rim nipple (19).

9 Claims, 12 Drawing Sheets

BICYCLE WHEEL HAVING A RIM AND A HUB CONNECTED BY SPOKES

FILED OF THE INVENTION

The invention relates to a bicycle wheel wherein tension is applied to a hub and a rim by threads formed on both ends of spokes to connect them.

BACKGROUND OF THE INVENTION

Spokes for integrally coupling a rim and a hub by applying tension between an annular rim for mounting a tire of a conventional general bicycle and a hub into which a wheel shaft is inserted are threadedly fitted in a nipple with external threads provided on one end thereof, are engaged with spoke holes of the annular rim by the nipple, one end thereof having its extreme end bent into a J-shape and inserted into spoke insert holes opened to a collar portion (hereinafter referred to as "hub collar"), a large diameter portion of the extreme end of the end being engaged with and stopped at the collar portion. Incidentally, the portion bent into the J-shape of the spokes is quickly deteriorated due to fatigue, thus shortening the service life of the spokes. Further, the fact that the hub collar surface is not formed in parallel with the elevation angle formed by the spokes stretched between the rim and the hub results in one of causes of shortening the service life of the spokes because a load is applied to the J-shaped portion of the spokes.

There has been known an arrangement wherein a spoke support shaft is inserted into a flange provided on a hub, a spoke insert hole for engaging one end of the spoke as a large diameter portion is provided in the spoke support shaft, and the spoke insert hole is made to be larger than axial diameter of the spoke so that the spoke is tiltable freely at an angle within a fixed range, whereby the other end of the spoke is threadedly engaged, in a linear state, with the nipple of the rim. However, in the above-described proposal, it is merely that the spoke insert hole of the spoke support shaft is larger than the diameter of the spoke as described above and is slightly smaller in diameter than the large diameter portion of the spoke end, and therefore, durability is not sufficient due to the force applied to the spokes so that the spokes tend to be slipped out.

Further, as spokes, aerospokes whose section is flattened in order to reduce air resistance during traveling are sometimes used. However, in case of such aerospokes having the section flattened as mentioned above, since the aerospokes cannot be inserted into normal spoke holes having a diameter of about 2 mm opened to the hub, it is necessary that a slit having a width of 1 to 2 mm is provided in the hub to form a spoke collar. Therefore, since the spoke collar is in contact with the slit, it cannot endure against the tension applied to the spokes, and is sometimes slipped out.

Furthermore, an open portion is provided in the spoke hole of the hub for inserting and mounting the aerospoke into the hub. However, since the open portion causes strength of the spoke hole to lower, it is necessary to make the circumference of the spoke hole thicker, which results in a defect of increasing weight of the hub.

According to the conventional rim, in a ratio between rim width and rim height, the rim width had a value larger than the rim height. However, recently, the air resistance of a bicycle has been discussed, and a rim having larger rim height has been developed. However, this rim has been used under the circumstances the number of spoke holes is the same as the conventional rim in which the number of spoke holes is 32 or 36. On the other hand, the fact that the rim height is large results in increasing the longitudinal rim strength in a centrifugal direction by about two times as compared with the conventional rim.

The fact that in the rim of high longitudinal rim strength, there are many spokes enables to supply a wheel without vibration even if spokes to which tension is not applied should present in spokes. That is, this means that even if the spoke tension is made somewhat uneven, wheels without vibration can be supplied. However, at present, the wheel without vibration as described produces vibration during the use to create trouble.

SUMMARY OF THE INVENTION

For solving the aforementioned problem, the invention provides a bicycle wheel in which tension is applied to a hub and a rim by threads formed on both ends of a spoke to connect both of them, wherein the engaging state of spokes stretched in a linear state is made optimal, the number of spokes is made the optimal number without play, and durability is high.

To solve the above issue, according to a first aspect, the present invention provides a bicycle wheel having spokes (4) disposed and connected between a hub collar (2) projected in a centrifugal direction on the outer circumference of each end of a hub (1) and a rim (3), wherein a hub collar surface (6) is disposed approximately parallel with the spokes at an elevation angle (5) caused by the spokes disposed between the hub collar and the rim, hub holes (9) one of which for inserting a hub nipple (8) comprising a circular body (7) is provided in said each hub collar surface extending through approximately at a right angle to said elevation angle, the outer peripheral surface of a hub nipple (19) is formed into an approximately same shape capable of being mounted on the inner peripheral surface of the hub hole (9), spoke insert holes (12) for inserting the spokes are bored in the outer peripheral surface of the hub collar into the inner peripheral surface of the hub holes, peripheral restraint walls (13) opposed with said spoke insert holes interposed are stood upright on the outer peripheral surface of the hub collar, one end of the spokes having external threads (15) on both ends thereof and being inserted from the spoke insert hole side is threadedly fastened with internal threads (16) provided in the hub nipple fitted into the hub hole, and the external threads on the other end of the spokes are threadedly fastened to the rim nipple having the internal threads mounted from the inside of the rim into the spoke holes formed in the rim to connect the hub and the rim.

According to a second aspect, the present invention provides a bicycle wheel having a rim and a hub connected by spokes, wherein in place of the constitution in which the spoke insert holes for inserting the spokes into the outer circumference surface of the hub collar are bored into the hub hole, and peripheral restraint walls opposed with the spoke insert holes interposed are stood upright, there is provided a constitution wherein the spoke insert holes for inserting the spokes into the outer circumference surface of the hub collar are disposed in two rows to left and right and bored into the hub hole, and 3-row peripheral restraint walls opposed with the spoke insert holes in 2-row to left and right interposed are stood upright.

According to a third aspect, the present invention provides a bicycle wheel having a rim and a hub connected by spokes, wherein the rim is that a ratio of a rim height (22) with respect to a rim width (21) is not less than one time, the rim height is not less than 20 mm, and the number of spoke holes formed in the rim is the number comprising a multiple of 4.

According to a fourth aspect, the present invention provides a bicycle wheel having a rim and a hub connected by spokes, wherein the external threads on both ends of the spokes are that the length thereof is set so that the length of the external threads on the other end are longer than that of the external threads on one end, the short external threads and the long external threads are threadedly fastened to the hub nipple and the rim nipple, respectively, to apply tension between the hub and the rim by the spoke for connection.

According to a fifth aspect, the present invention provides a bicycle wheel having a rim and a hub connected by spokes, wherein the hub collar surface (6) is formed approximately parallel with the elevation angle of 2 to 10°.

According to a sixth aspect, the present invention provides a bicycle wheel having a rim and a hub connected by spokes, wherein the inner peripheral surface of the hub hole is formed to be circular which is approximately the same diameter as that of the hub nipple comprising a circular body, and the spoke insert holes bored into the inner peripheral surface of the hub hole formed in the outer peripheral surface of the hub collar is formed into a slit (20).

According to a seventh aspect, the present invention provides a bicycle wheel having a rim and a hub connected by spokes, wherein the length of the circular body of the hub nipple is the same as or somewhat shorter than or longer than the thickness of the collar width (23) of the hub collar, and the external threads formed on one end of the spokes are threadedly fastened to the internal threads for connecting spokes provided in the hub nipple extending therethrough or not extending therethrough.

According to a eighth aspect, the present invention provides a bicycle wheel having a rim and a hub connected by spokes, wherein the spokes are fitted into the hub holes opened approximately at a right angle to the elevation angle, are threadedly fastened to the circular body of the hub nipple shaped to be rotatable in the direction of a plane angle (24), and are stretched while being applied with tension without being bent between the hub collar and the rim.

According to a ninth aspect, the present invention provides a bicycle wheel having a rim and a hub connected by spokes, wherein the spoke threaded hole (26) of the hub nipple is opened in the center of the circular body or to be displaced on the end side from the center.

As described above, in the present invention, the hub collar surface is formed approximately in parallel with the elevation angle on the spokes stretched between the hub and the rim, the hub hole for inserting and mounting the spokes into the hub collar approximately at a right angle is opened to the hub collar surface, the hub nipple is fitted into the hub hole, and the spokes are threadedly fastened to the hub nipple, thus enabling stretching the spokes in a linear form. Further, the slits in the outer periphery of the hub collar for stretching the spokes are formed in two rows, the spokes can be stretched changing a position of the rows alternately (in a zigzag manner) so that the spokes are not put one upon another when the crossed spokes are crossed with reach other, thus enabling enhancing the strength and light-weighting. Furthermore, since the spokes can be stretched while enhancing the strength as described, the number of spokes can be reduced to 16 to 28 as compared with the conventional bicycle wheel, thus enabling light-weighting.

BRIEF DESCRIPTION OF THE DRAWINGS

The invention will be described below with reference to the drawings which illustrate embodiments, in which.

Figure 1:
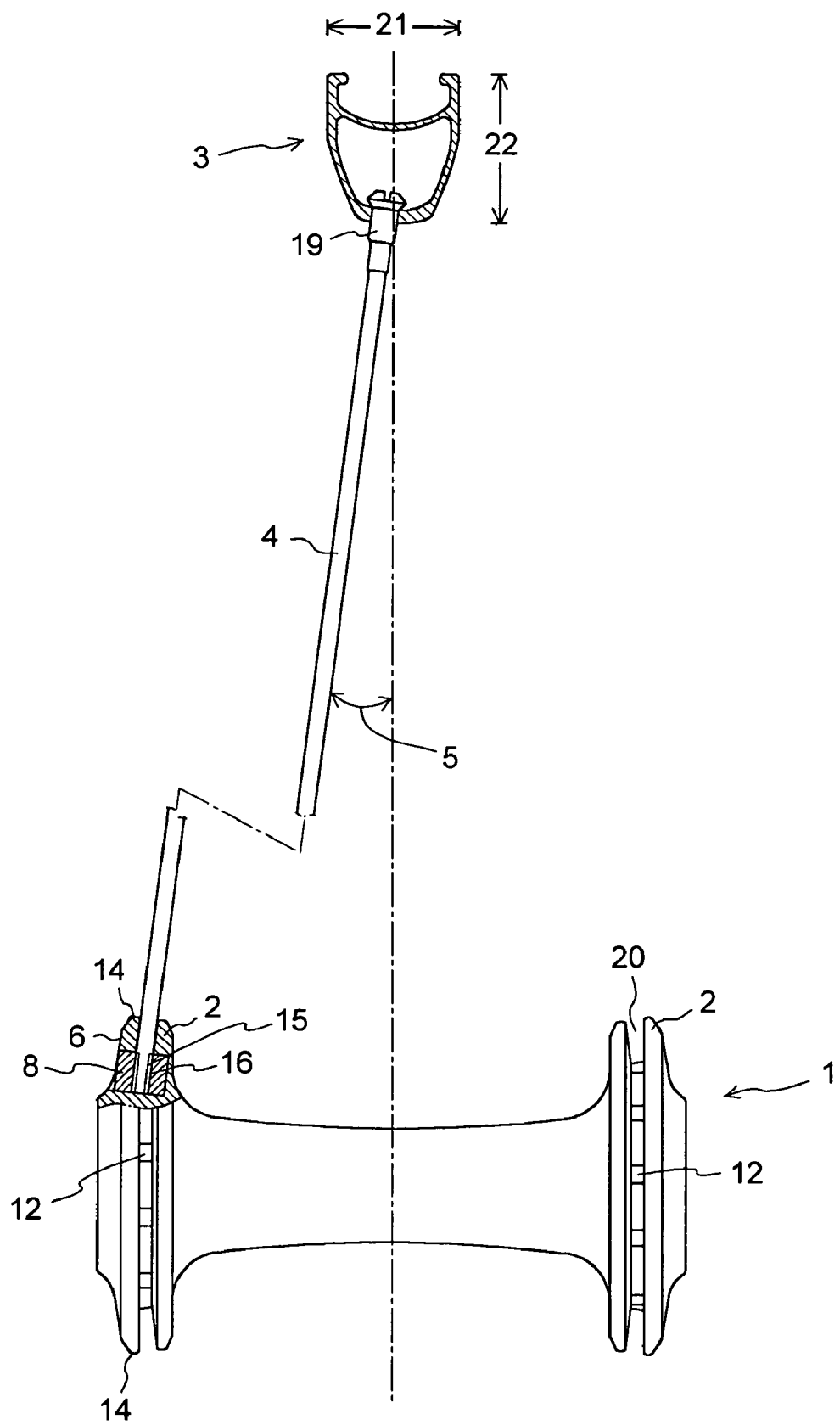
FIG. 1 is a view schematically showing a mounting construction or a rim and a spoke relative to a hub of a bicycle, showing a part of the hub according to the present invention cutaway.
Figure 2:
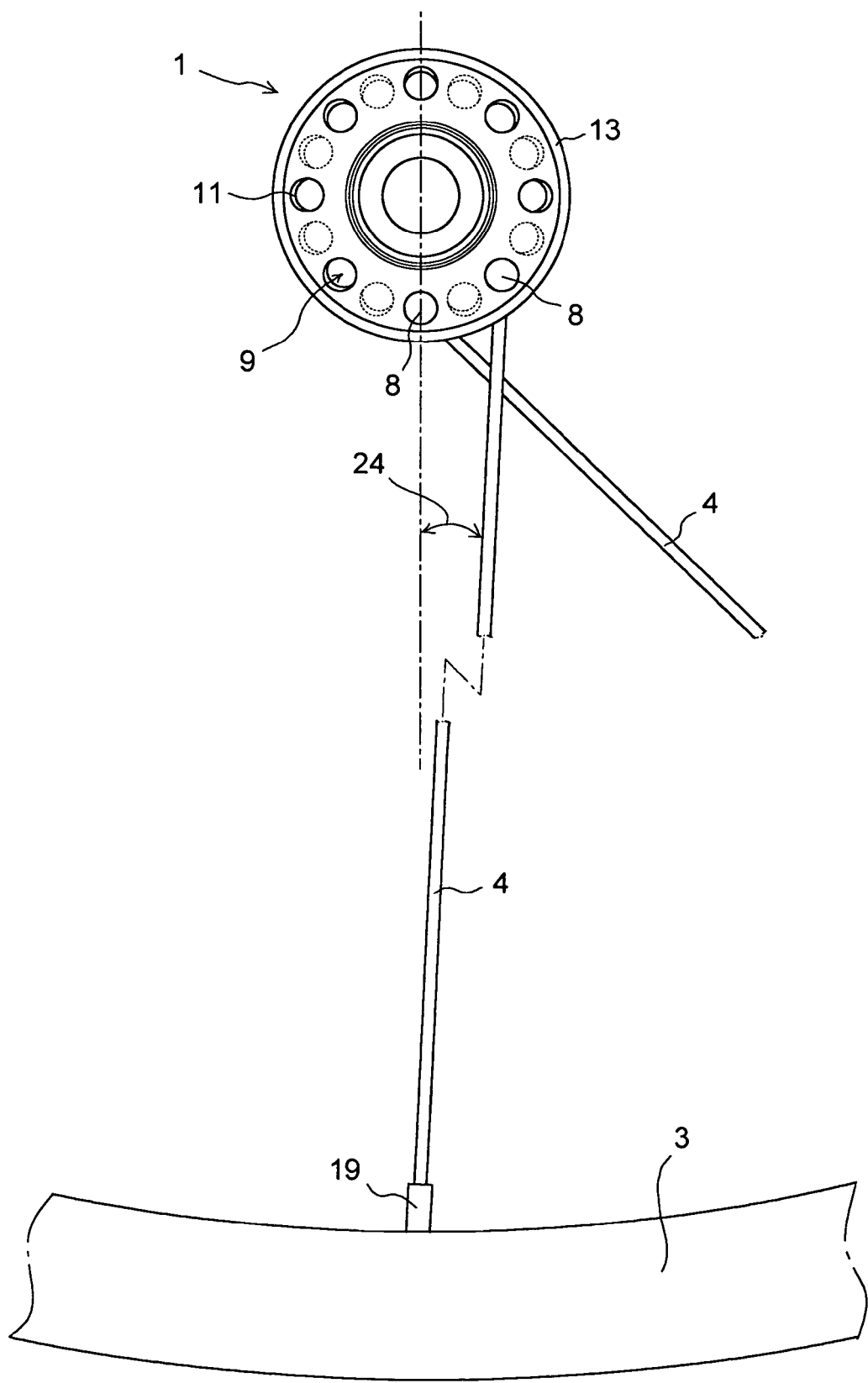
FIG. 2 is a side view schematically showing an outline of a mounting construction of a hub of a rim, a spoke and 1-row slit of a bicycle, with a part of the spoke cutaway.
Figure 3A:
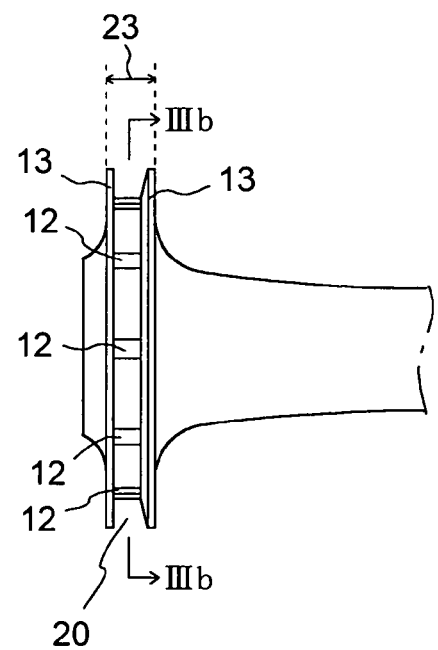
FIG. 3a and FIG. 3b are respectively schematic views, 3a showing one hub of a wheel, 3b being a view taken on line IIIb—IIIb.
Figure 3B:
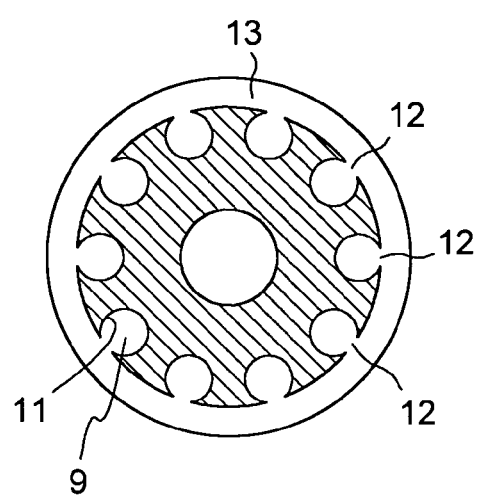
Figure 4A:
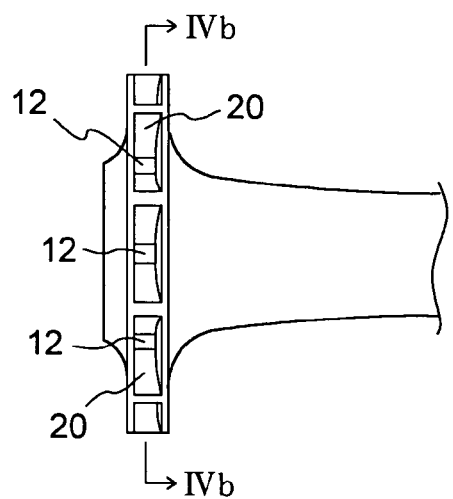
FIG. 4a and FIG. 4b are respectively schematic views showing the construction of a hub of another shape, 4a showing one hub of a wheel, 4b being a view taken on line IVb—IVb.
Figure 4B:
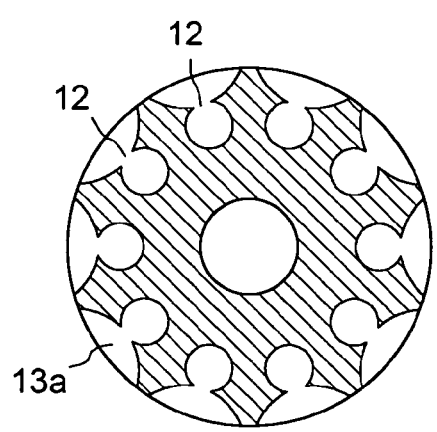

The reference numerals appearing in FIG. 1 to FIG. 13 are described as follows: 1: hub, 2: hub collar, 3: rim, 4: spoke, 5: elevation angle, 6: hub collar, 7: circular body, 8: hub nipple, 9: hub hole, 10: outer peripheral surface, 11: inner peripheral surface, 12: spoke insert hole, 13: peripheral restraint wall, 13a: local restraint wall, 14: outer peripheral surface of a hub collar, 15: external threads, 16: internal threads, 17: spoke hole, 18: notch portion, 19: rim nipple, 20: slit, 21: rim width, 22: rim height, 23: collar width, 24: plane angle, 25: crossing point, 26: spoke threaded hole, 27: tire, 28: air valve.

DETAILED DESCRIPTION OF THE INVENTION

The embodiments according to the present invention will be described hereinafter with reference to the drawings.

First, an embodiment according to a first feature of the invention will be described. The bicycle wheel is formed with a hub collar 2 projected ringwise in a centrifugal direction on the outer circumference of both ends of a hub 1, and a spoke 4 is disposed and connected between the hub collar 2 and a rim 3. In the present invention, a hub collar surface 6 is formed on the hub 1 approximately parallel with an elevation angle 5 caused by the spoke 4 stretched between the hub collar 2 and the rim 3. A hub hole 9 is provided extending through approximately at a right angle to the elevation angle 5 in order to insert a hub nipple 8 formed on a circular body 7 into the hub collar surface 6. An outer peripheral surface 10 of the circular body 7 of the hub nipple 8 is formed to have the size of approximately same shape having a diameter capable of being mounted on an inner peripheral surface 11 of the hub hole 9. Further, an outer peripheral surface 14 of the hub collar 2 is formed with a spoke insert hole 12 into which the spoke 4 is inserted, the spoke insert hole 12 being bored to the inner peripheral surface 11 of the hub hole 9. On the other hand, a peripheral restraint wall 13 having the spoke insert hole 12 interposed and opposite left and right thereof is stood upright ringwise on the outer peripheral surface 14 of the hub collar 2. The peripheral restraint wall 13 is provided to protect the engagement state of the spoke 4 with the hub 1 in a stabilized manner.

Figure 5:
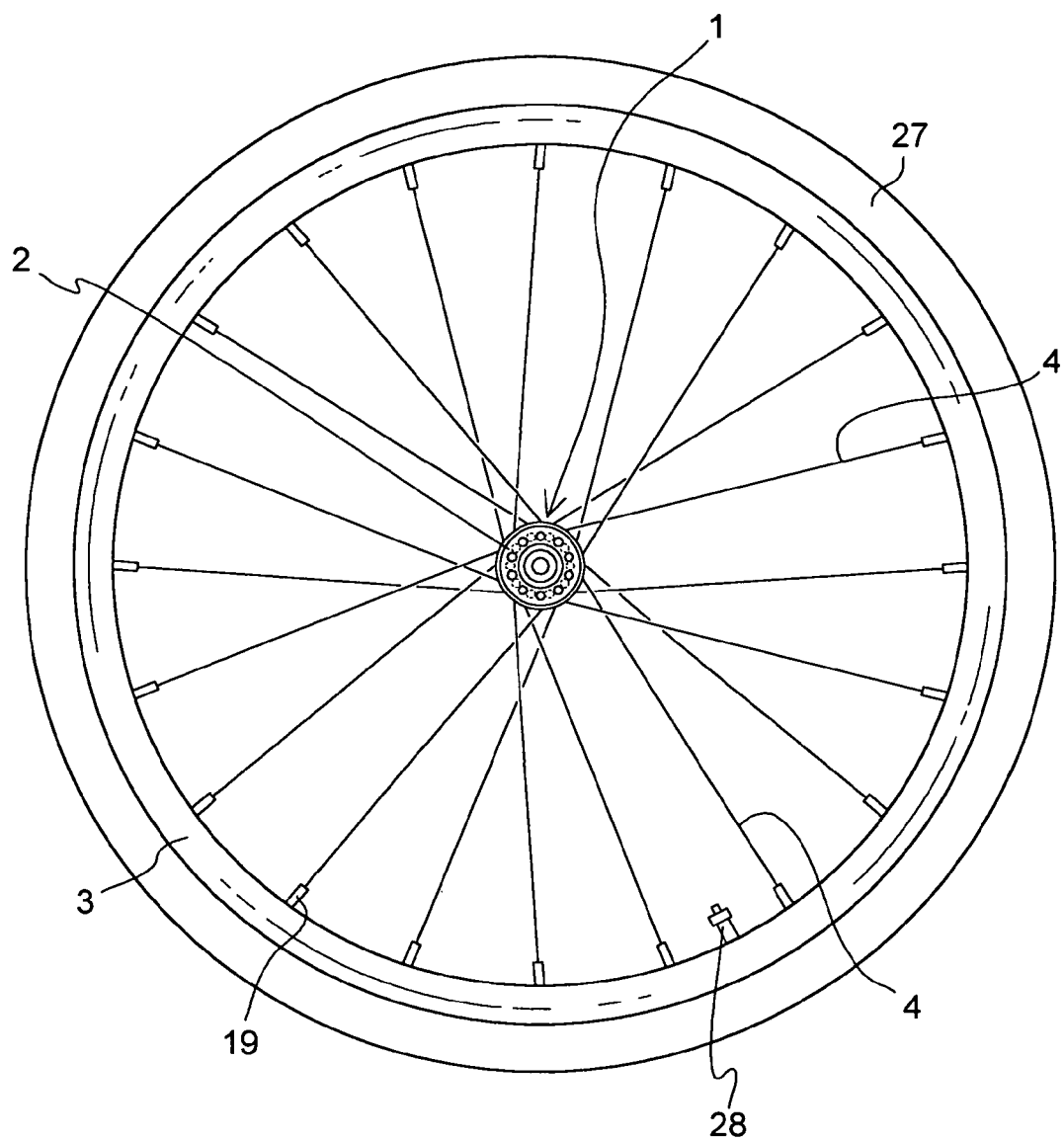
FIG. 5 is a side view of a wheel using the hub according to the present invention.
Figure 6:
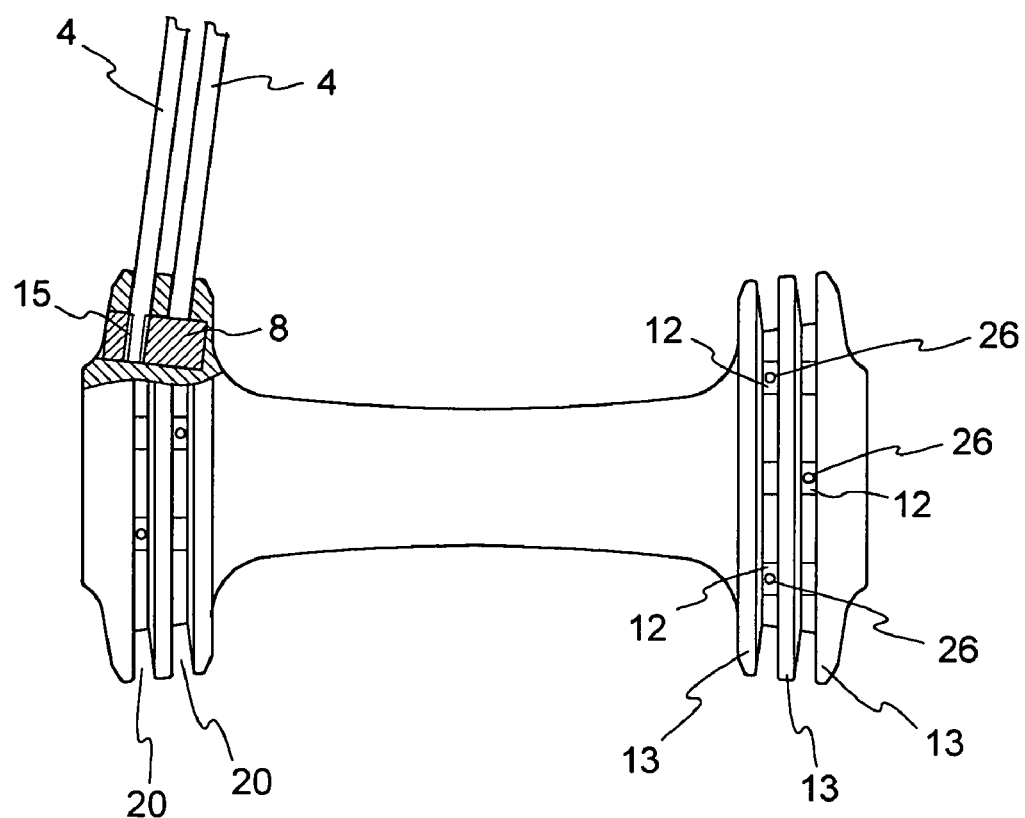
FIG. 6 is a view showing a part of a hub of a 2-row slit cutaway according to the present invention.
Figure 7:
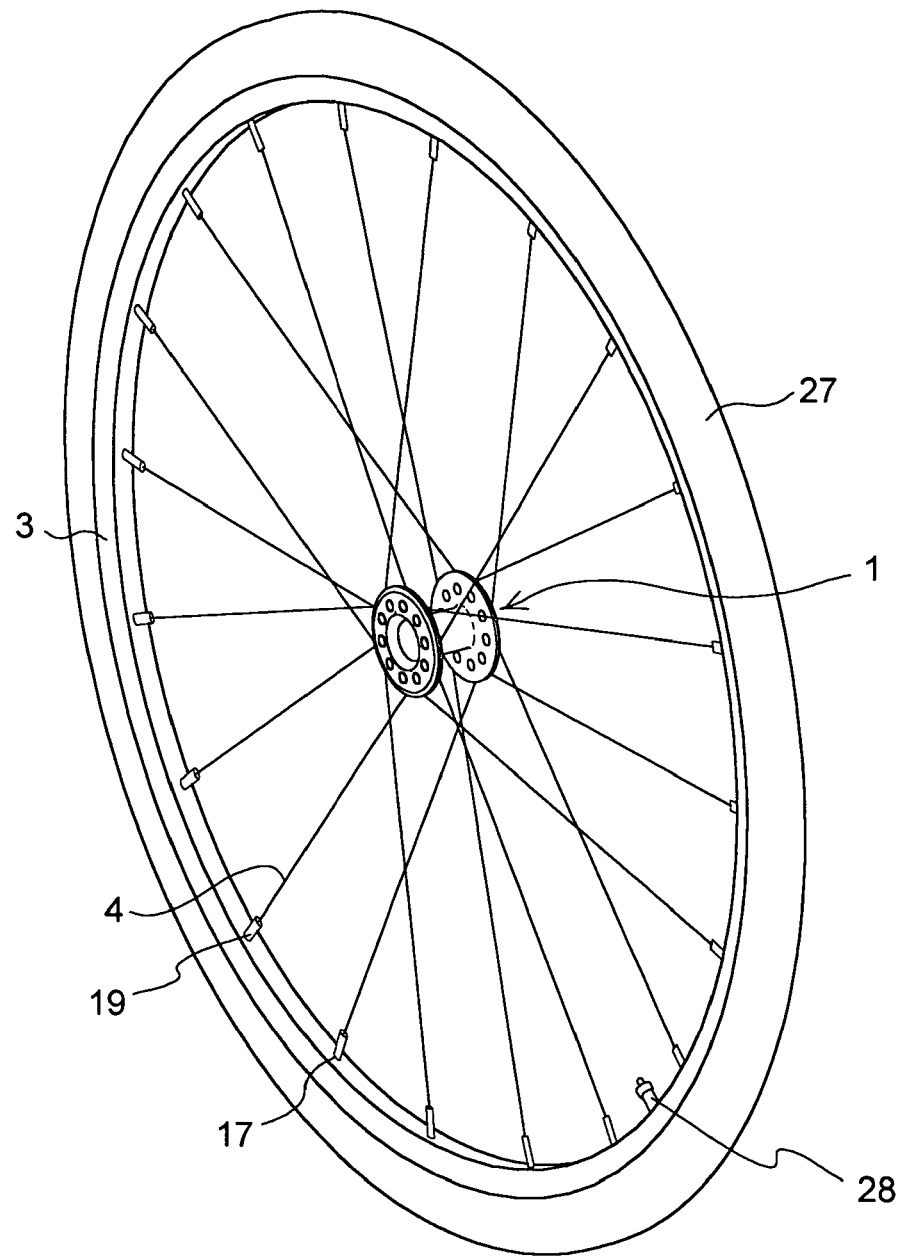
FIG. 7 is a perspective view showing that a tire is fitted in the wheel using the hub of the 1-row slit shown in FIG. 1.
Figure 8:
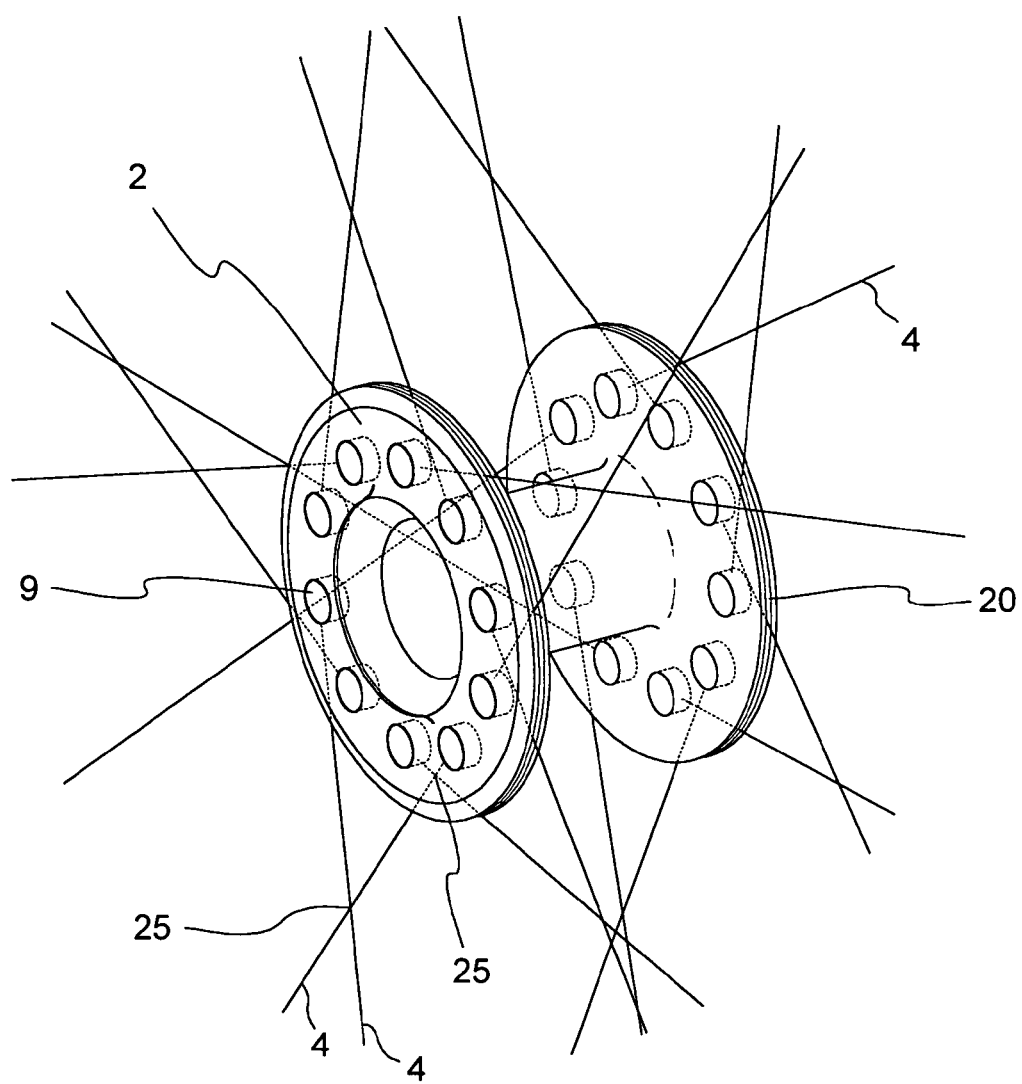
FIG. 8 is a perspective view showing the mounting circumstances of the hub having the one row slit and spokes
Figure 9:
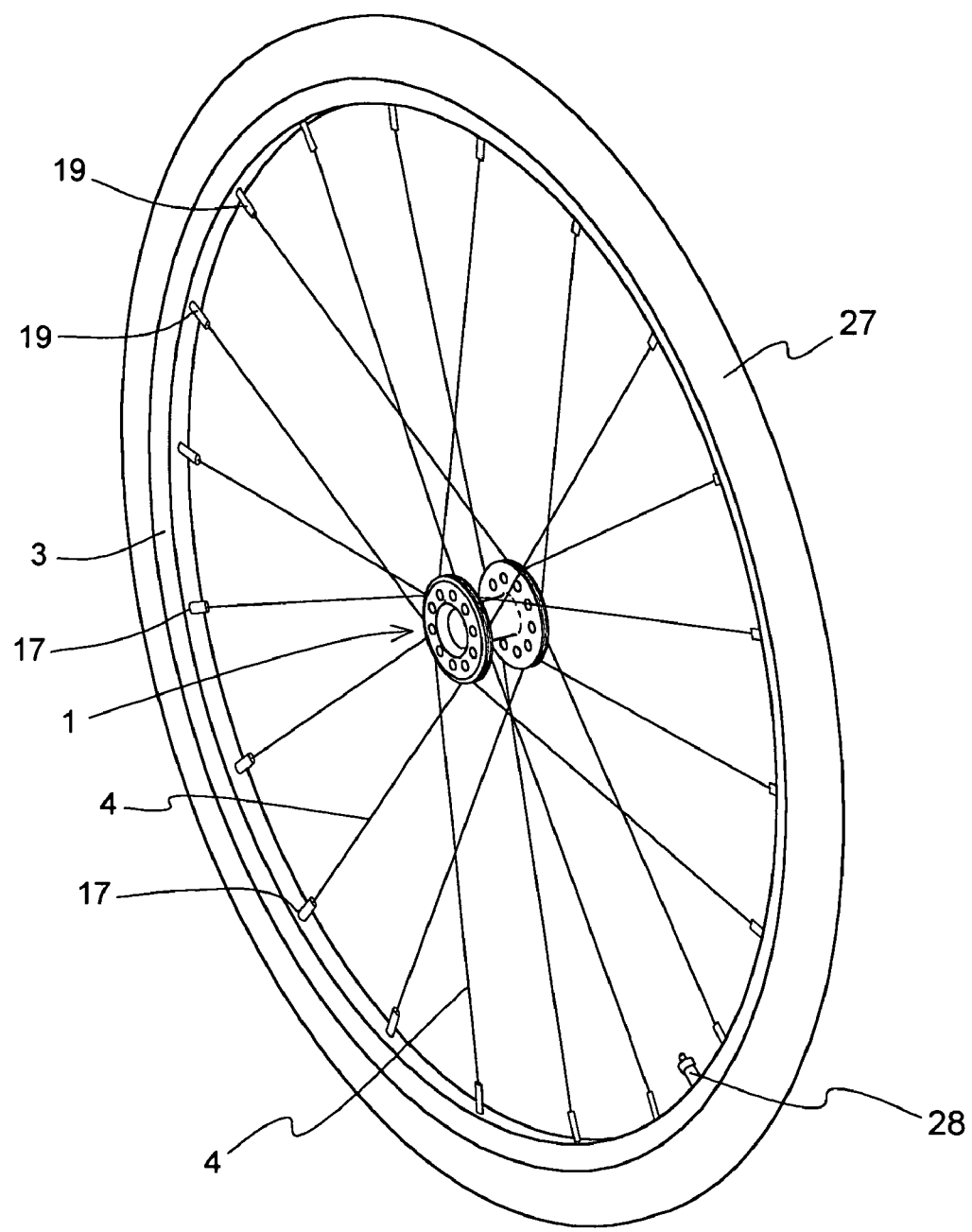
FIG. 9 is a perspective view showing that a tire is fitted in the wheel using the hub of the two-row slit shown in FIG. 6.
Figure 10:
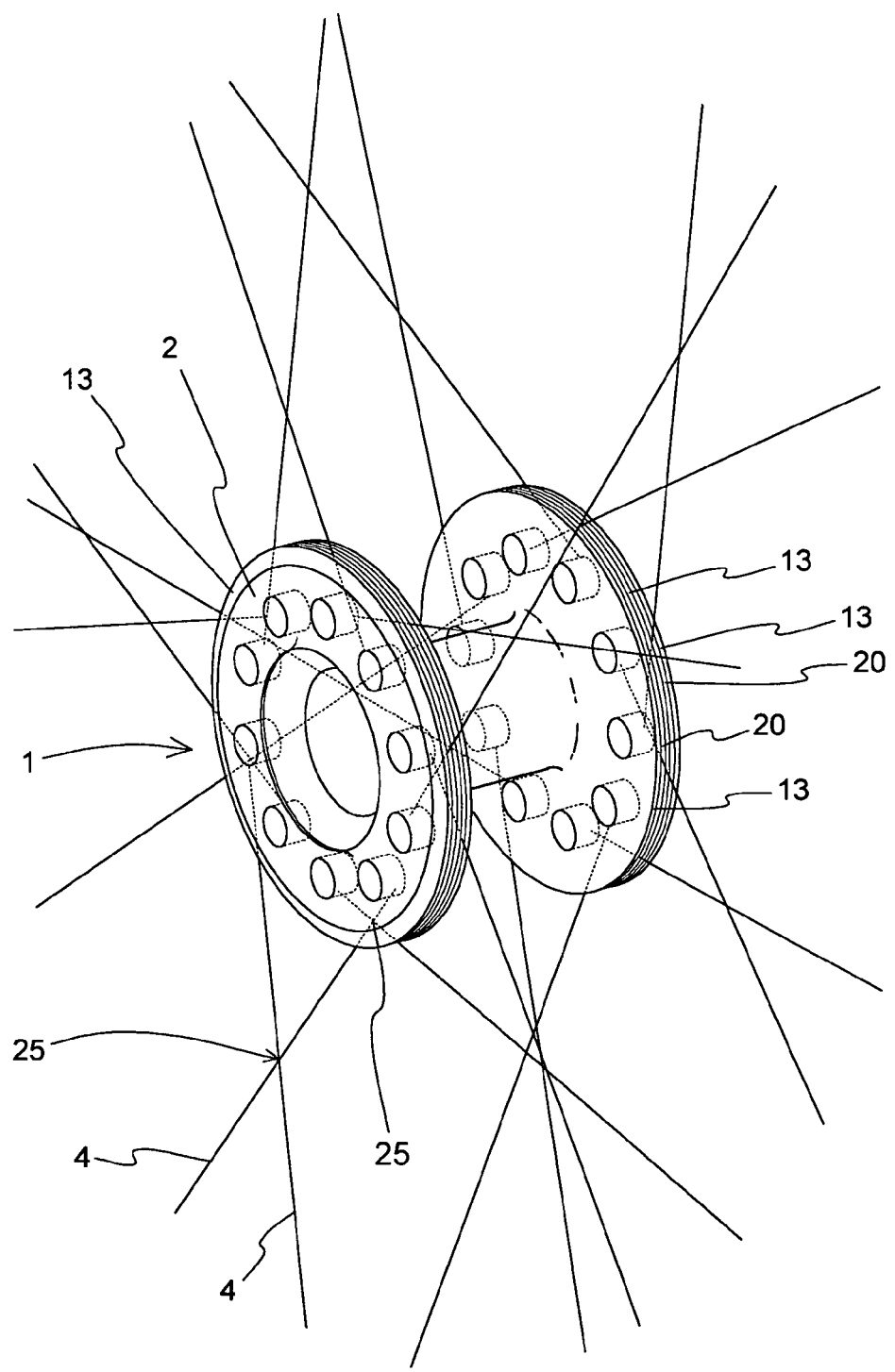
FIG. 10 is a perspective view showing the mounting circumstances of the hub having the 2-row slit and spokes
Figure 11A:
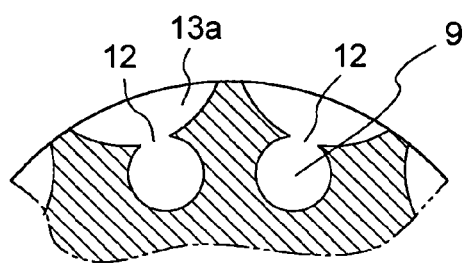
FIG. 11a, FIG. 11b and FIG. 11c, FIG. 11d are respectively sectional views showing a hub collar surface formed with hub holes of the different shape for mounting hub nipples, FIG. 11a and FIG. 11b being an example having no continuous peripheral restraint wall, FIG. 11c and FIG. 1d being an example having a continuous peripheral restraint wall.
Figure 11B:
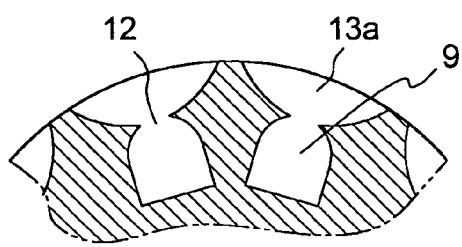
Figure 11C:
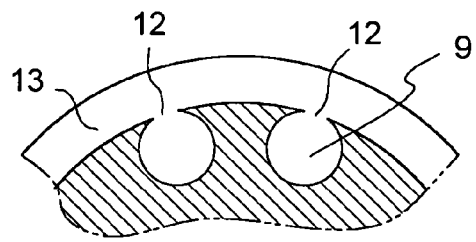
Figure 11D:
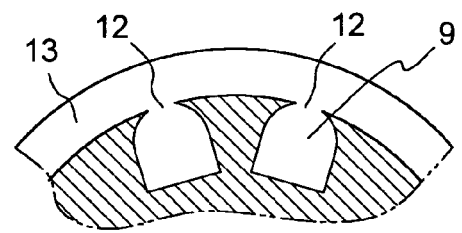

The spokes 4 are formed with external threads 15 on both ends thereof, and each external thread 15 on one end of the spoke 4 is fastened to internal thread 16 provided on the circular body 7 of the hub nipple 8 inserted from the spoke insert hole 12 side and fitted into the hub hole 9. Further, this is a bicycle wheel so designed that a rim nipple 19 having the internal threads 16 is mounted in a spoke hole 17 formed in the rim 3 from the outside of the rim 3, the external threads 15 on the other end of the spokes 4 are fastened to the internal threads 16 of the rim nipple 19 mounted into the rim 3, the hub 1 and the rim 3 are connected by the spokes 4, and the rim 3 and the hub 1 are connected by the spokes 4, a tire 27 being fitted in the rim 3 of the wheel, for example, as shown in FIG. 5, the rim 3 having an air valve 28.

As described above, in the connection of the rim 3 and the hub 1 by a plurality of spokes 4, the spokes comprise a spoke crossing in which intermediate portions thereof are crossed, similarly to the assembly of a normal bicycle.

An embodiment according to a second feature of the invention will be described. In this embodiment, in place of the constitution of the aforementioned first feature wherein the spoke insert hole 12 for inserting the spoke 4 into the outer circumference surface 14 of the hub collar 2 is bored into the hub hole 9, and 2-row peripheral restraint walls 13 opposed with the spoke insert hole 12 interposed are stood upright, there is provided a constitution wherein the spoke insert holes 12 for inserting the spokes 4 are disposed alternately (in a zigzag manner) in two rows to left and right and bored into the hub hole 9, and 3-row peripheral restraint walls 13 opposed with the spoke insert holes 12 in 2-row to left and right interposed. By doing so, the spokes 4 are not put one upon another in the spoke crossing in which the spokes are disposed in 2-row to left and right, and sufficient tension may be applied evenly accordingly. This is the bicycle wheel in which other structures are similar to those of the above-described first feature.

Further, an embodiment according to a third feature of the invention will be described. In this embodiment, the rim 3 of the bicycle wheel is that a ratio of a rim height 22 with respect to a rim width 21 is not less than one time, and the rim height 22 is not less than 20 mm. The number of spoke holes 17 forming the rim is the number comprising a multiple of 4 between 16 and 28. This is the bicycle wheel in which other structures are similar to those of the above-described feature.

An embodiment according to a fourth feature of the invention will be described. In this embodiment, the spokes 4 are formed with the external threads 15 on both ends thereof, the external threads 15 on one end thereof being formed between 4 and 7 mm from the end, which is enabled to be threadedly fastened to the hub nipple 8, whereas the external threads 15 on the other end thereof being formed between 8 and 12 mm from the end, which is enabled to be threadedly fastened to the rim nipple 19. These spokes 4 are threadedly fastened to the hub nipple 8 and the rim nipple 19, respectively, and stretched by applying tension between the hub 1 and the rim 3 to firmly connect the hub 1 and the rim 3. This is the bicycle wheel in which other structures are similar to those of any one of the above-described features.

An embodiment according to a fifth feature of the invention will be described. In this embodiment, the hub collar 2 has a collar width 23 having a thickness of 5 to 8 mm. Further, the hub collar surface 6 is formed in a surface approximately parallel with the elevation angle 5 comprising 2 to 10°. This is the bicycle wheel in which other structures are similar to those of any one of the above-described features.

An embodiment according to a sixth feature of the invention will be described. In this embodiment, the hub collar surface 6 of the hub collar 2 is that the inner peripheral surface 11 of the hub hole 9 formed approximately at a right angle to the hub collar surface 6 is formed to be circular having approximately the same diameter as that of the circular body 7 of the hub nipple 8. The spoke insert hole 12 bored in a direction of a wheel axis from the outer peripheral surface 14 of the hub collar 2 and reaching the inner peripheral surface 11 of the hub hole 9 is formed into the slit 20 between the peripheral restraint walls 13. This is the bicycle wheel in which other structures are similar to those of any one of the above-described features.

An embodiment according to a seventh feature of the invention will be described. In this embodiment, the length of the circular body 7 of the hub nipple 8 is the same as or somewhat shorter than or longer than the thickness of the collar width 23 of the hub collar 2. Further, the depth of the internal threads 16 for connecting the spokes opened to the hub nipple 8 is 4 to 7 mm, and the external threads 15 formed on one end of he spokes 4 are threadedly fastened to the internal threads 16 and extended therethrough, or threadedly fastened halfway without causing the external threads 15 to extend through the internal threads 16. This is the bicycle wheel in which other structures are similar to those of any one of the above-described features.

An embodiment according to an eighth feature of the invention will be described. In this embodiment, the spokes 4 are threadedly fastened to the spoke threaded hole 26 of the circular body 7 of the hub nipple 8, and the circular body 7 of the hub nipple 8 is fitted into the hub hole 9 opened to the hub collar surface 6 approximately at a right angle to the elevation angle 5 between the rim 3 and the hub collar 2. Further, the spokes 4 are threadedly fastened to the spoke threaded hole 26 opened to the circular body 7 of the hub nipple 8 shaped to be rotatable in the direction of the plane angle 24. The spokes 4 are stretched while being applied with tension without being bent between the hub collar 2 and the rim 3. This is the bicycle wheel in which other structures are similar to those of any one of the above-described features.

An embodiment according to a ninth feature of the invention will be described. In this embodiment, the spoke threaded hole 26 of the hub nipple 8 fitted in the hub hole 9 is opened in the center of the circular body 7 or to be displaced on the end side from the center. This is the bicycle wheel in which other structures are similar to those of any one of the above-described features.

In the above-described embodiments, the spokes 4 of the bicycle wheel according to the present invention are that similarly to the engagement with respect to the conventional rim, the engagement with the hub 1 is carried out by the hub nipple 8 comprising the circular body 7, and the hub nipple 8 and the spokes 4 are threadedly fastened in the spoke threaded holes 26. The hub nipple 8 is comprised of the circular body 7, whereby even if the spokes 4, being provided with the hub collar 2 and the plane angle 24, that is, the spokes are crossed, they can be freely rotated laterally by the circular body 7, and therefore, even if the plane angle 24 is provided, the spokes 4 can be stretched between the hub 1 and the rim 3 while maintaining a linear form. Because of this, even if tension is applied to the spokes 4, tension can be applied evenly to the spokes 4 without play of all the spokes 4 stretched on the wheel. Accordingly, since no useless spokes 4 with play are present, it is not necessary to stretch many spokes like a rim having 32 holes or 36 holes as in the conventional bicycle, thus lightening the wheel by that portion.

Similarly, in the arrangement which uses the hub nipple 8 in the present invention, the hub collar surface 6 is formed in parallel with the elevation angle 5 formed by the spokes 4, and the hub hole 9 for inserting and mounting the hub nipple 8 approximately at a right angle to the hub collar surface 6 is opened. Therefore, the spokes 4 threadedly engaged with the hub nipple 8 can be also stretched between the hub 1 and the rim 3 while maintaining a linear form.

However, where the peripheral restraint walls 13 provided in the circumferential direction on the outer peripheral surface 14 of the hub collar 2 having the hub nipple 8 inserted and mounted therein are of two rows on left and right, eight to fourteen spokes 4 are inserted and mounted in one row in the slit 20 between the two rows on left and right. The spokes 4 inserted and mounted in one row as described are that in case of crossing, the spokes 4 are crossed at the spoke intersection 25, and since they are put one upon another at the spoke intersection 25, the spokes 4 are somewhat bent thereat.

However, as in the embodiment of the second feature, three-wall peripheral restraint walls 13 are provided on the outer peripheral surface 14 of the hub collar 2 and two-row slits 20 are provided in parallel, whereby the spokes 4 are inserted into the two slits 20 alternately (in a zigzag manner), and the crossed spokes 4 are stretched between the hub 1 and the rim 3 while maintaining the linear form without colliding with each other at the spoke intersection 25 when crossing at the spoke intersection 25, thus further enhancing the strength of the wheel. By doing so, the spokes 4 with play produced in the above-described conventional wheel can be overcome, and the number of the spokes 4 to be stretched on the wheel can be reduced to a multiple of 4 of 16 to 28, as a result of which the wheel can be lightweighted.

Figure 12A:
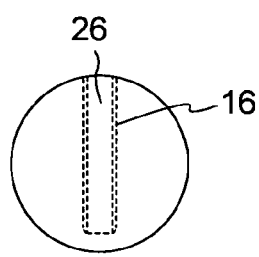
FIGS. 12a to 12d are sectional views and perspective views of various hub nipples of different shapes.
Figure 12A:
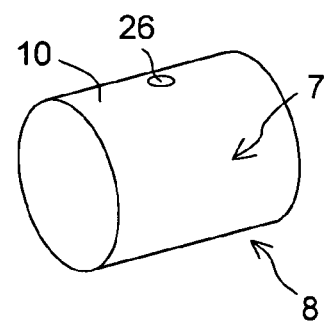
Figure 12B:
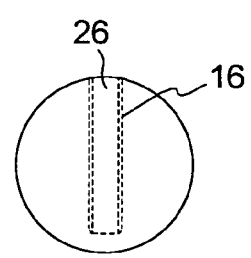
Figure 12B:
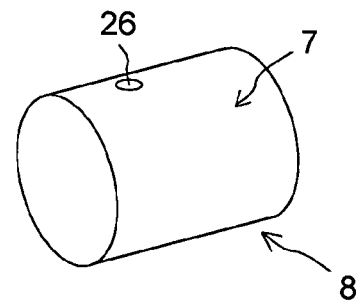

When the two-row parallel slits 20 are employed as described, in the hub nipple 8, the spoke threaded hole 26 is opened while being deviated toward the end from the center of the circular body 7, as shown in FIGS. 12b and 12b', and where the spokes 4 are inserted from the right slit 20 out of two-row slits 20 and where the spokes 4 are inserted from the left slit 20, the hub nipple 8 is inverted so that they can be adapted to the respective positions. On the other hand, where the width of the slit 20 is sufficiently narrow, the length of the circular body 7 of the hub nipple 8 can be shortened, in which case, therefore, when the spoke threaded hole 26 is provided in the center of the length of the circular body as shown in FIG. 12a' so that the spokes 4 may pass through the left and right slits 20, the length of the circular body 7 is shortened so as to prevent them from flying out from the surface of the hub collar 2.

In the structure in which two-row peripheral restraint walls 13 opposed with the spoke insert hole 12 interposed therebetween are stood upright, the length of the circular body 7 of the hub nipple 8 is made longer than the width 23 of the collar 2 or the width of the slit 20, whereby the spoke threaded hole 26 is provided in the center of the circular body 7 as in FIG. 12a', and the hub nipple 8 is moved to and disposed at a position that the spokes 4 are to be alternate (a zigzag state). It is noted of course that the hub nipple 8 in which the width of the circular body 7 is made longer than the width 23 of the collar 2 or the width of the slit 20 may be also used for the structure in which three peripheral restraint walls 13.

Figure 12C:
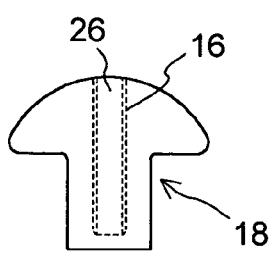
Figure 12C:
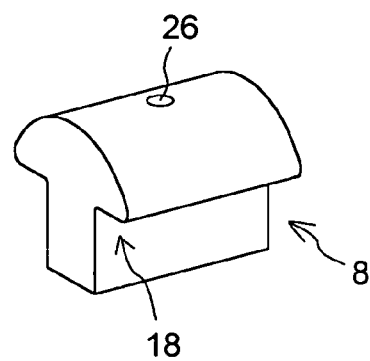
Figure 12D:
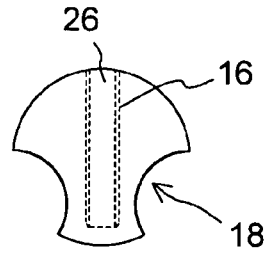
Figure 12D:
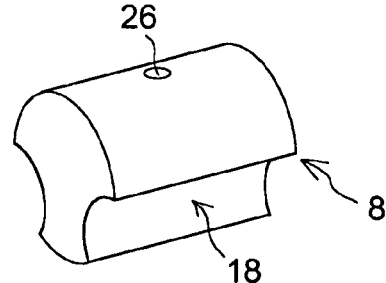
Figure 13A:
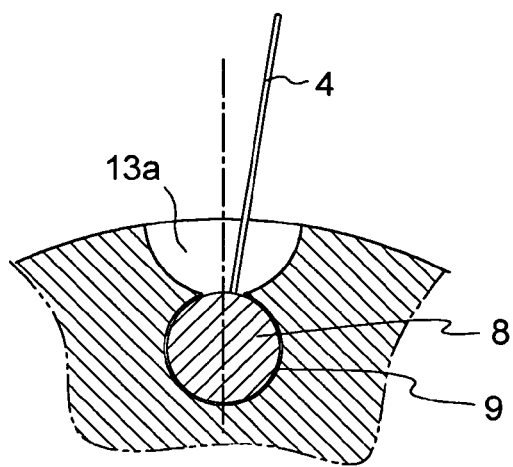
FIGS. 13a and 13b are respectively sectional views in which the hub nipple shown in FIGS. 12a and 12b having spokes inserted is fitted in the hub hole shown in FIGS. 11a and 11b.
Figure 13B:
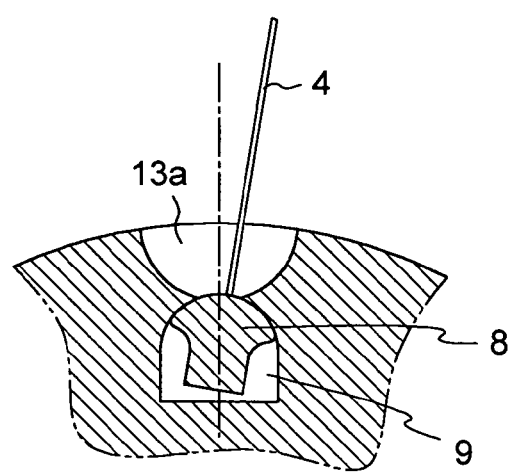

The shape of the hub hole 9 provided in the hub collar 2 can be made, other than a circle, such that only the portion in the centrifugal direction is a circular and the wheel shaft side is a square. The shape of the hub nipple 8 can be also made, adjusting to the shape of the former, such that as shown in FIGS. 12c and 12d, the upper portion in the centrifugal direction from the circular body 7 is an arc, and the side portion on the wheel shaft side is a notch portion 18 recessed in the form of an arc, which can be light-weighted by a portion of the recessed notch 18.

Further, while the slit 20 formed in the outer peripheral surface 14 of the hub collar 2 can be formed around on the whole surface of the outer peripheral surface of the hub collar 2 as described above, it is noted the slit 20 is partly formed only in front and behind of the spoke insert hole 12 for inserting and mounting the spokes 4, and the spokes 4 can be stretched without trouble by providing crossing with an angle of the elevation angle 24. By doing so, it not necessary to provide the peripheral restraint walls 13 on the whole circumference, but local restraint walls 13a are partly formed only in the circumference of the spoke insert holes 12 to enable strengthening the hub 1 by that portion.

What is claimed is:

1. A bicycle wheel having spokes disposed and connected between a hub collar projected in a centrifugal direction on the outer circumference of each end of a hub and a rim, wherein a hub collar surface is disposed approximately parallel with the spokes at an elevation angle caused by the spokes disposed between the hub collar and the rim, hub holes for inserting hub nipples comprising a circular body are provided in said each hub collar surface extending through approximately at a right angle to said elevation angle, the outer peripheral surface of hub nipples is formed into an approximately same shape capable of being mounted on the inner peripheral surface of hub holes, spoke insert holes for inserting the spokes are bored in the outer peripheral surface of the hub collar into the inner peripheral surface of the hub holes, peripheral restraint walls opposed with said spoke insert holes interposed are stood upright on the outer peripheral surface of the hub collar, one end of the spokes having external threads on both ends thereof and being inserted from the spoke insert hole side is threadedly fastened with internal threads provided in the hub nipple fitted into the hub hole, and the external threads on the other end of the spokes are threadedly fastened to the rim nipple having the internal threads mounted from the inside of the rim into the spoke holes formed in the rim to connect the hub and the rim.

2. A bicycle wheel having a rim and a hub connected by spokes as claimed in claim 1, wherein the spoke insert holes for inserting the spokes into the outer circumference surface of the hub collar are disposed in two rows to left and right and bored into the hub hole, and 3-row peripheral restraint walls opposed with the spoke insert holes in 2-row to left and right interposed are stood upright.

3. A bicycle wheel having a rim and a hub connected by spokes as claimed in claim 1, wherein the rim has a ratio of rim height to rim width of not less than one, the rim height is not less than 20 mm, and the number of spoke holes formed in the rim is the number comprising a multiple of 4.

4. A bicycle wheel having a rim and a hub connected by spokes as claimed in claim 1, wherein the external threads on both ends of the spokes are set to a length thereof such that the length of the external threads on one end are longer than that of the external threads on the other end, the short external threads and the long external threads are threadedly fastened to the hub nipple and the rim nipple, respectively, to apply tension between the hub and the rim by the spoke for connection.

5. A bicycle wheel having a rim and a hub connected by spokes as claimed in claim 1, wherein the hub collar surface is formed approximately parallel with the elevation angle of 2 to 10°.

6. A bicycle wheel having a rim and a hub connected by spokes as claimed in claim 1, wherein the inner peripheral surface of the hub hole is formed to be circular which is approximately the same diameter as that of the hub nipple comprising a circular body, and the spoke insert holes bored into the inner peripheral surface of the hub hole formed in the outer peripheral surface of the hub collar is formed into a slit.

7. A bicycle wheel having a rim and a hub connected by spokes as claimed in claim 1, wherein the length of the circular body of the hub nipple is approximately the same as or longer than the thickness of the collar width of the hub collar, and the external threads formed on one end of the spokes are threadedly fastened to the internal threads for connecting spokes provided in the hub nipple extending therethrough or not extending therethrough.

8. A bicycle wheel having a rim and a hub connected by spokes as claimed claim 1, wherein the spokes are fitted into the hub holes opened approximately at a right angle to the elevation angle, are threadedly fastened to the circular body of the hub nipple shaped to be rotatable in the direction of a plane angle, and are stretched while being applied with tension without being bent between the hub collar and the rim.

9. A bicycle wheel having a rim and a hub connected by spokes as claimed in claim 1, wherein the spoke threaded hole of the hub nipple is opened in the center of the circular body or to be displaced on the end side from the center.

* * * * *